(12) United States Patent (10) Patent No.: US 8,943,477 B2
Martineau et al. (45) Date of Patent: Jan. 27, 2015

(54) DEBUGGING A GRAPHICAL USER INTERFACE CODE SCRIPT WITH NON-INTRUSIVE OVERLAYS

(71) Applicant: International Business Machines Corporation, Armonk, NY (US)

(72) Inventors: James I. Martineau, Somerville, MA (US); Lorelei M. McCollum, Somerville, MA (US); Michael S. McCowan, Somerville, MA (US)

(73) Assignee: International Business Machines Corporation, Armonk, NY (US)

( * ) Notice: Subject to any disclaimer, the term of this patent is extended or adjusted under 35 U.S.C. 154(b) by 86 days.

(21) Appl. No.: 13/717,794

(22) Filed: Dec. 18, 2012

(65) Prior Publication Data

US 2014/0173568 A1    Jun. 19, 2014

(51) Int. Cl.
*G06F 9/44* (2006.01)
(52) U.S. Cl.
USPC .......................... 717/125; 717/124; 717/126
(58) Field of Classification Search
USPC ................................................. 717/124–130
IPC .............. G06F 11/30,11/362, 11/3636, 11/3668
See application file for complete search history.

(56) References Cited

U.S. PATENT DOCUMENTS

| 5,926,638 | A | 7/1999 | Inoue | |
|---|---|---|---|---|
| 6,202,199 | B1 * | 3/2001 | Wygodny et al. | 717/125 |
| 6,282,701 | B1 * | 8/2001 | Wygodny et al. | 717/125 |
| 6,587,995 | B1 | 7/2003 | Duboc et al. | |
| 6,721,941 | B1 * | 4/2004 | Morshed et al. | 717/127 |
| 7,058,928 | B2 * | 6/2006 | Wygodny et al. | 717/128 |
| 7,086,033 | B2 * | 8/2006 | Bates et al. | 717/124 |
| 7,293,259 | B1 * | 11/2007 | Dmitriev | 717/130 |
| 7,386,839 | B1 * | 6/2008 | Golender et al. | 717/131 |
| 7,814,463 | B2 | 10/2010 | Dandoy | |
| 7,840,851 | B2 | 11/2010 | Hayutin | |
| 8,010,839 | B2 | 8/2011 | Shimura | |
| 8,239,836 | B1 * | 8/2012 | Franz et al. | 717/127 |
| 8,312,435 | B2 * | 11/2012 | Wygodny et al. | 717/130 |
| 8,504,994 | B2 * | 8/2013 | Golender et al. | 717/128 |
| 8,572,573 | B2 * | 10/2013 | Baliga et al. | 717/125 |
| 8,572,578 | B2 * | 10/2013 | Stall | 717/129 |
| 8,671,393 | B2 * | 3/2014 | Bates | 717/124 |
| 2004/0230954 | A1 | 11/2004 | Dandoy | |
| 2005/0268285 | A1 | 12/2005 | Bagley et al. | |
| 2007/0101293 | A1 | 5/2007 | Cherry et al. | |

(Continued)

OTHER PUBLICATIONS

Zanden et al, "An Explanation-Based, Visual Debugger for One-way Constraints", ACM, vol. 6, issue 2, pp. 207-216, 2004.*

(Continued)

*Primary Examiner* — Anil Khatri
(74) *Attorney, Agent, or Firm* — John W. Hayes (57) ABSTRACT

An embodiment of the present invention manages window focus non-intrusive over-lays while debugging a graphical user interface program. In an example, the computer displays in a first graphical user interface, wherein the computer program is designed to manipulate a second graphical user interface of another computer program. The computer receives a command to debug the second graphical interface computer program and converts the first graphical user interface into a focus-less graphical user interface so the focus does not transfer from the second graphical user interface. The computer debugs the computer program and upon completing debugging, the computer restores the first graphical user interface into focus.

10 Claims, 4 Drawing Sheets

(56) References Cited

U.S. PATENT DOCUMENTS

2009/0013313 A1 1/2009 Kato et al.
2009/0320002 A1 12/2009 Peri-Glass et al.

OTHER PUBLICATIONS

Koju et al, "An Efficient and Generic Reversible Debugger using the Virtual Machine based Approach", ACM, pp. 79-88, 2005.*
Kumar et al, "Transparent Debugging of Dynamically Instrumented Programs ", ACM, vol. 33, No. 5, pp. 57-62, 2005.*
Chern et al, "Debugging with Controlflow Breakpoints" ACM, pp. 96-106, 2007.*
Barton et al, "Dynamic and Graphical Web Page Breakpoints", ACM, pp. 81-90, 2010.*
Kurniawan et al, "An IDE Framework for Grid Application Development", IEEE, pp. 184-191, 2008.*
Heiskanen et al., "Debug Support for Model-Based GUI Testing", IEEE computer Society: 2010 Third International Conference on Software Testing, Verification and Validation, pp. 25-34, Copyright: 2010 <URL: http://ieeexplore.ieee.org/xpl/login.jsp?tp=&arnumber=5477102&url=http://ieeexplore.ieee.org/xpls/abs_all.jsp?arnumber=5477102>.
Cocoabuilder.com, "Xcode's ability to take away the window focus form other applications", Dec. 23, 2007, Printed Jul. 20, 2012, <URL: http://www.cocoabuilder.com/archive/cocoa/195420-xcode-ability-to-take-away-the-window-focus-form-other-applications.html>.
Krauss, K, et al. U.S. Appl. No. 13/717,768, filed Dec. 18, 2012.
Krauss, K, et al. U.S. Appl. No. 14/078,661, filed Nov. 13, 2013.
IBM, "Focus-defined Application Meta-Toolbar", Oct. 28, 2004, IP.com [online], [retrieved on Nov. 4, 2011]. Retrieved from: Prior Art Database, IP.com number: IPCOM000032273D.
Martineau, J et al. U.S. Appl. No. 14/078,788, filed Nov. 13, 2013.
Pettichord, "Design for Testability", Presented at Pacific Northwest Software Quality Conference, Portland, Oregon, Oct. 2002, Copyright: Bret Pettichord, 2002.

* cited by examiner

DEBUGGING A GRAPHICAL USER INTERFACE CODE SCRIPT WITH NON-INTRUSIVE OVERLAYS

FIELD OF THE INVENTION

The present invention relates generally to the field of debugging software, and more particularly to window focus on graphical user interfaces.

BACKGROUND OF THE INVENTION

Most computing devices, applications and complex tools rely upon a user interface to interact with, receive input from and provide information to users. There are many types of user interfaces which can be implemented and they can include graphical user interfaces (GUI), character user interfaces (CUI) and web-based user interfaces. The development of such software containing user interfaces, more specifically GUIs, involve the proper testing and verification of the performance and functionality of the GUI being tested. The testing of the GUI typically requires user interaction to ensure the aspects of the GUI are properly covered. Depending on the complexity of the GUI, the number of manual operations by the user to test the GUI can easily be an order of large magnitude. An automated GUI testing program, referred to herein as a GUI automation program, could be used to automatically simulate these otherwise manual operations by the user. However, since a GUI automation program is software in itself, it also has to be tested to ensure proper functionality.

As a GUI automation program performs its own testing functions on a GUI, a debugger program may simultaneously test the GUI automation program to ensure that the GUI automation program is functioning properly. During this process, the GUI being tested is the focus of the display. The GUI automation program and the debugger program typically operate in an integrated development environment (IDE). During the process of debugging an application, the IDE may take over the window focus in order to display information to the user. Any input made on the IDE may disrupt the GUI automation program and any automated processes or input being made by the automation program (i.e., mouse movement) on the GUI under test.

SUMMARY

Embodiments of the present invention disclose a method, computer program product, and computer system for managing window focus while debugging a graphical user interface automation.

In an example, the computer displays in a first graphical user interface, wherein the first graphical user interface is designed to manipulate a second graphical user interface of another computer program. The computer receives a command to debug the second graphical interface computer program. The computer converts the first graphical user interface into a focus-less graphical user interface. The first graphical interface program computer debugs the computer program. Subsequent to completion of said debugging, the computer restores the first graphical user interface into focus.

DETAILED DESCRIPTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer readable program code/instructions embodied thereon.

Any combination of computer-readable media may be utilized. Computer-readable media may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of a computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java®, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

Figure 1:
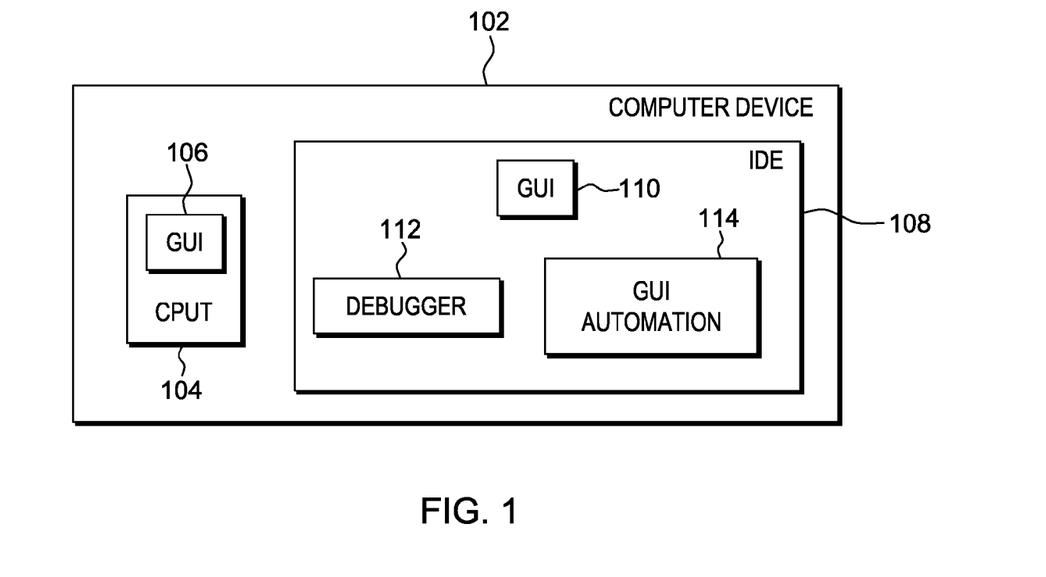
FIG. 1 is a functional block diagram illustrating a distributed data processing environment, in accordance with an embodiment of the present invention.

The present invention will now be described in detail with reference to the Figures. FIG. 1 is a functional block diagram illustrating computer device 102 containing various programs, in accordance with one embodiment of the present invention.

Computer device 102 may be a laptop computer, tablet computer, netbook computer, personal computer (PC), a desktop computer, a personal digital assistant (PDA), a smart phone, or any programmable electronic device capable of hosting a graphical user interface (GUI). Computer program under test (CPUT) 104 and Integrated Development Environment (IDE) 108 are located on computer device 102. IDE 108 hosts debugger program 112 and GUI automation program 114. IDE 108 allows for the use of one graphical user interface (i.e., GUI 110) for both debugger program 112 and GUI automation program 114, so that a user has one window capable of displaying output of each program instead of two separate windows.

IDE 108 is not limited to hosting debugger program 112 and GUI automation program 114. It will also be recognized that although debugger program 112 and GUI automation program 114 may be accessed via IDE 108 sharing a single GUI in one embodiment, in another embodiment, these programs may have their own GUIs rather than sharing a single GUI (i.e. GUI 110). Debugger program 112 evaluates the state and code script of CPUT 104 as well as the state and code script of GUI automation program 114 so it can intercept, modify, and represent troubleshooting aspects of tasks being performed as part of CPUT 104 and its GUI 106. CPUT 104 may be any program utilizing a GUI.

Figure 2:
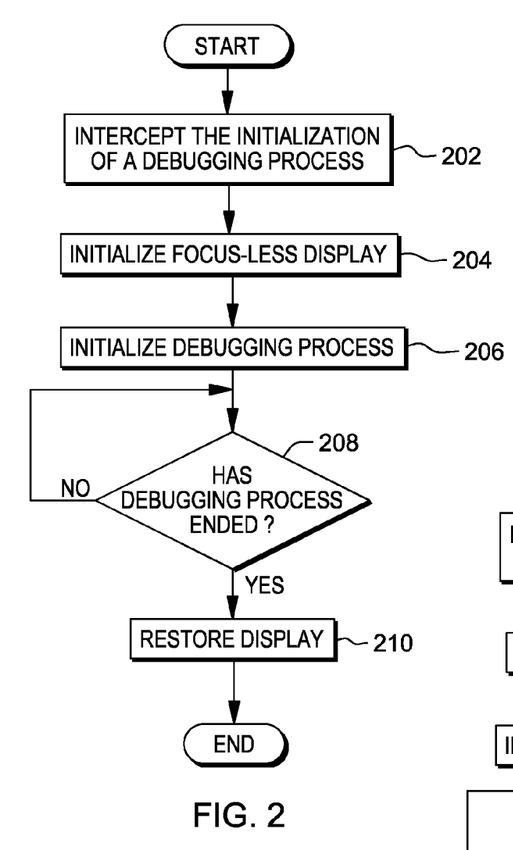
FIG. 2 is a flowchart depicting operational steps for implementing a focus-less graphical user interface as part of an IDE, on a computer device within the data processing environment of FIG. 1, in accordance with an embodiment of the present invention.

FIG. 2 is a flowchart, depicting operational steps of implementing a focus-less GUI display as part of an IDE while debugging an automated GUI testing program, in accordance with an embodiment of the present invention.

In an exemplary embodiment, CPUT 104 is being tested by manipulating GUI 106 via GUI automation program 114. During this process, debugger program 112 can detect and/or be used to correct any errors in (i.e., debug) the code of CPUT 104 and/or the code script of GUI automation program 114. GUI automation program 114 and debugger program 112 are hosted by IDE 108, allowing them to share a single graphical display window. GUI 106 retains the window focus of computer device 102 while GUI automation program 114 causes CPUT 104 to perform tasks automatically. As GUI automation program 114 performs scripted inputs on GUI 106, the state of CPUT 104 can be evaluated by debugger program 112 to ensure that certain defined behaviors (i.e. exception conditions, values out of range, etc.) either do not occur or coincide as expected with the inputs being performed.

Prior to the debugging process beginning, IDE 108 intercepts the initialization of the debugging process (step 202). Since debugger program 112 and GUI automation program 114 are part of IDE 108, IDE 108 has the ability to detect when a program (i.e., debugger program 112) is performing a task, thus intercepting the task. In this example, the task being performed is the initialization of the debugging process by debugger program 112. Once IDE 108 intercepts the initialization of the debugging process, IDE 108 initializes a focus-less display (step 204). The focus-less display (i.e., GUI 110) allows for the focus to remain on the GUI being tested by GUI automation program 114 (i.e., GUI 106). The focus-less display of GUI 110 is a semi-transparent display appearing in front of all other GUIs which may be present. Due to the semi-transparent display, the user will be able to see what is being presented by GUI 110 as well as GUI 106. The focus-less display of GUI 110 allows for debugger program 112 to convey information which may be, but is not limited to, the status of GUI automation program 114 and the correlating code script, specified breakpoints, highlighted program code errors, user controls, or a status report. The focus-less display of GUI 110 allows for information to be available to the user during the debugging process without having to switch between two or more GUIs (i.e., GUI 106 and GUI 110).

IDE 108 initializes the debugging process (step 206) which was previously intercepted in the discussion of step 202. As a result of the focus-less display of GUI 110, GUI 106 is evaluated properly by GUI automation program 114 since GUI 106 retains the window focus.

IDE 108 monitors the debugging process to determine if the debugging process has ended (step 208). Upon determining the debugging process has ended (yes branch, step 208), IDE 108 restores the display (i.e. GUI 110) into focus (step 210). IDE 108 will bring GUI 110 into focus since GUI 106 is no longer being tested by GUI automation program 114.

Figure 3:
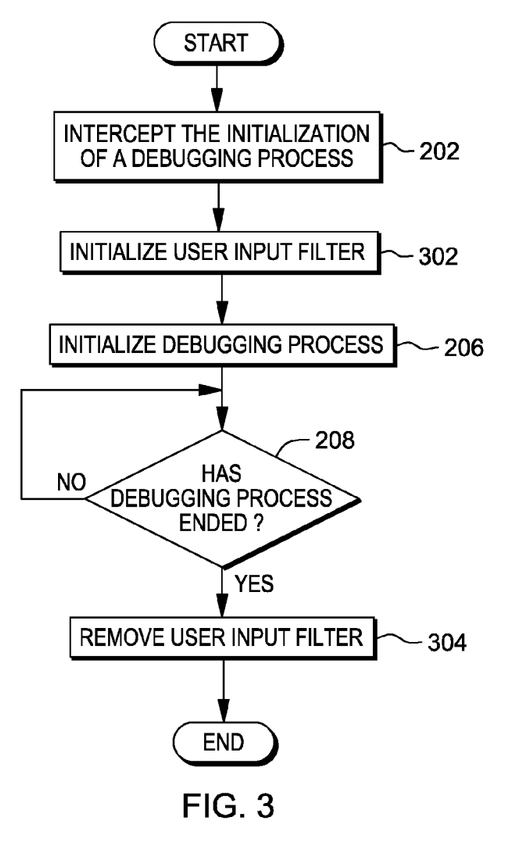
FIG. 3 is a flowchart depicting operational steps for implementing a user input filter as part of an IDE, on a computer device within the data processing environment of FIG. 1, in accordance with an embodiment of the present invention.

FIG. 3 is a flowchart depicting operational steps for implementing a user input filter as part of an IDE while debugging an automated GUI testing program in accordance with an embodiment of the present invention.

In an exemplary embodiment, focus-less display of GUI 110 as previously mentioned in the discussion of FIG. 2, operates in parallel with the process of filtering user inputs. Prior to the debugging process beginning, IDE 108 intercepts the initialization of the debugging process (step 202). Once IDE 108 intercepts the initialization of the debugging process, IDE 108 initializes user input filter (step 302). In this example, the user input filter is a feature of IDE 108 which allows for IDE 108 to receive input from the user while the debugging process of the GUI automation program 114 is occurring. The user input filter will coincide with the focus-less display of GUI 110 so it does not interfere with GUI automation program 114 properly testing GUI 106. GUI automation program 114 can use the same set of user input controls (i.e., mouse and keyboard) to evaluate GUI 106 as a user may need to access information on the focus-less display of IDE 108. The user can specify when the user inputs are to be entered on the focus-less GUI 110 rather than GUI 106. The user can "step-into" or "step-over" the code script of GUI automation program 114 by entering a specified set of commands which are not normally used by GUI automation program 114 to evaluate GUI 106. Stepping-into the code script of GUI automation program 114 allows for the user to alter the code script and make appropriate changes according to information provided by debugger program 112. Stepping-over the code script of GUI automation program 114 allows for the user to enter in new code-script prior to it being used to test CPUT 104. Such specified sets of commands allowing for the user to step-into or step-over the code script of GUI automation program 114, may be located in a directory of IDE 108. The directory can have the specified sets of commands pre-programmed or the user can select their own preferences for which commands correspond to each user input.

IDE 108 initializes the debugging process (step 206) which was previously intercepted in the discussion of step 202 upon which then IDE 108 monitors the debugging process to determine if the debugging process has ended (step 208). Upon determining the debugging process has ended (yes branch, step 208), IDE 108 removes the user input filter (step 304). Any input entered by the user in IDE 108 will automatically be part of the window focus and no longer filtered by IDE 108.

The use of non-intrusive overlays (i.e., focus-less display and user input filter) allows for proper debugging of the code script of GUI automation program 114 while it tests GUI 106 belonging to CPUT 104.

Figure 4:
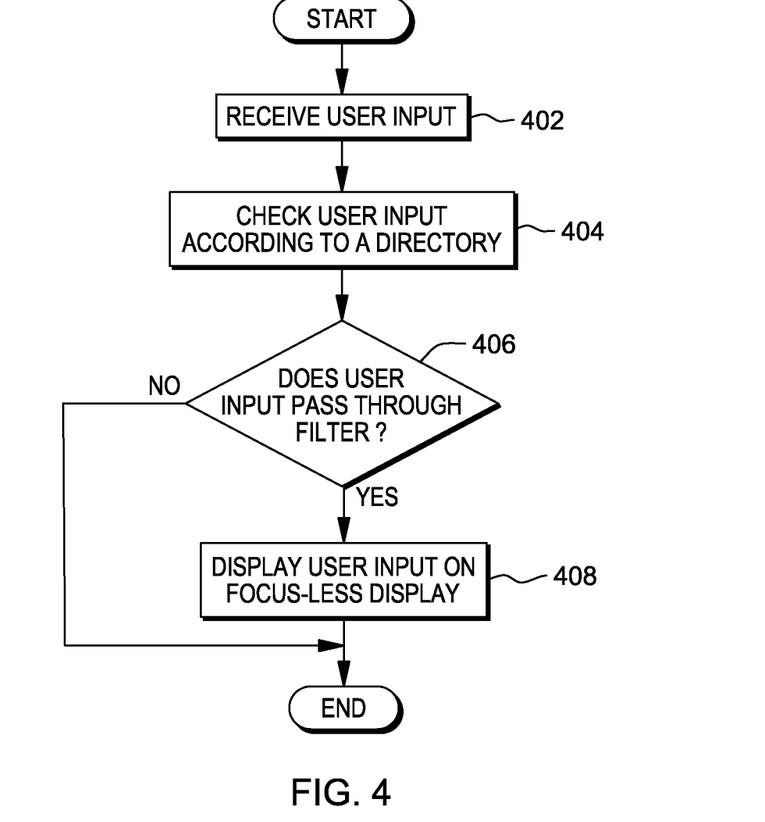
FIG. 4 is a flowchart depicting operational steps for filtering a user input by an IDE, in accordance with an embodiment of the present invention.

FIG. 4 is a flowchart depicting operational steps for filtering a user input by IDE 108, in accordance with an embodiment of the present invention. When a debugging process is initialized as previously discussed in step 206, user input filter would have been initialized on the focus-less display of GUI 110.

IDE 108 receives a user input (step 402). The user input received by IDE 108 may be through any device that can communicate with the computer device 102. Such a device may contain but is not limited to: a keyboard, a mouse or a separate computing device. Upon receiving the input, IDE 108 checks the user input according to a directory (step 404). The directory is a specified list of commands which allow for the user inputs to be filtered through to IDE 108. In an example, the directory can be a list of a predetermined set of combination of keys pressed on a keyboard which will allow for the user to be able to provide input into IDE 108 without drawing the window focus away from GUI 106. As previously mentioned in the discussion of FIG. 3, the list may contain but is not limited to a combination of keys for stepping into or stepping over the code script of GUI automation program 114. The combination of keys would not be used in the testing of CPUT 104 by GUI automation program 114. This is to ensure the command representing the specific combination of keys pressed will not interfere in the testing being performed by GUI automation program 114.

IDE 108 determines if the user input can pass through the filter (step 406). Upon IDE 108 determining the input entered by the user is not on the directory (no branch, step 406), IDE 108 will not display those inputs on the focus-less display of GUI 110. Upon IDE 108 determining the input entered by the user is on the directory (yes branch, step 406), IDE 108 displays user input on the focus-less display of GUI 110 (step 408).

Figure 5:
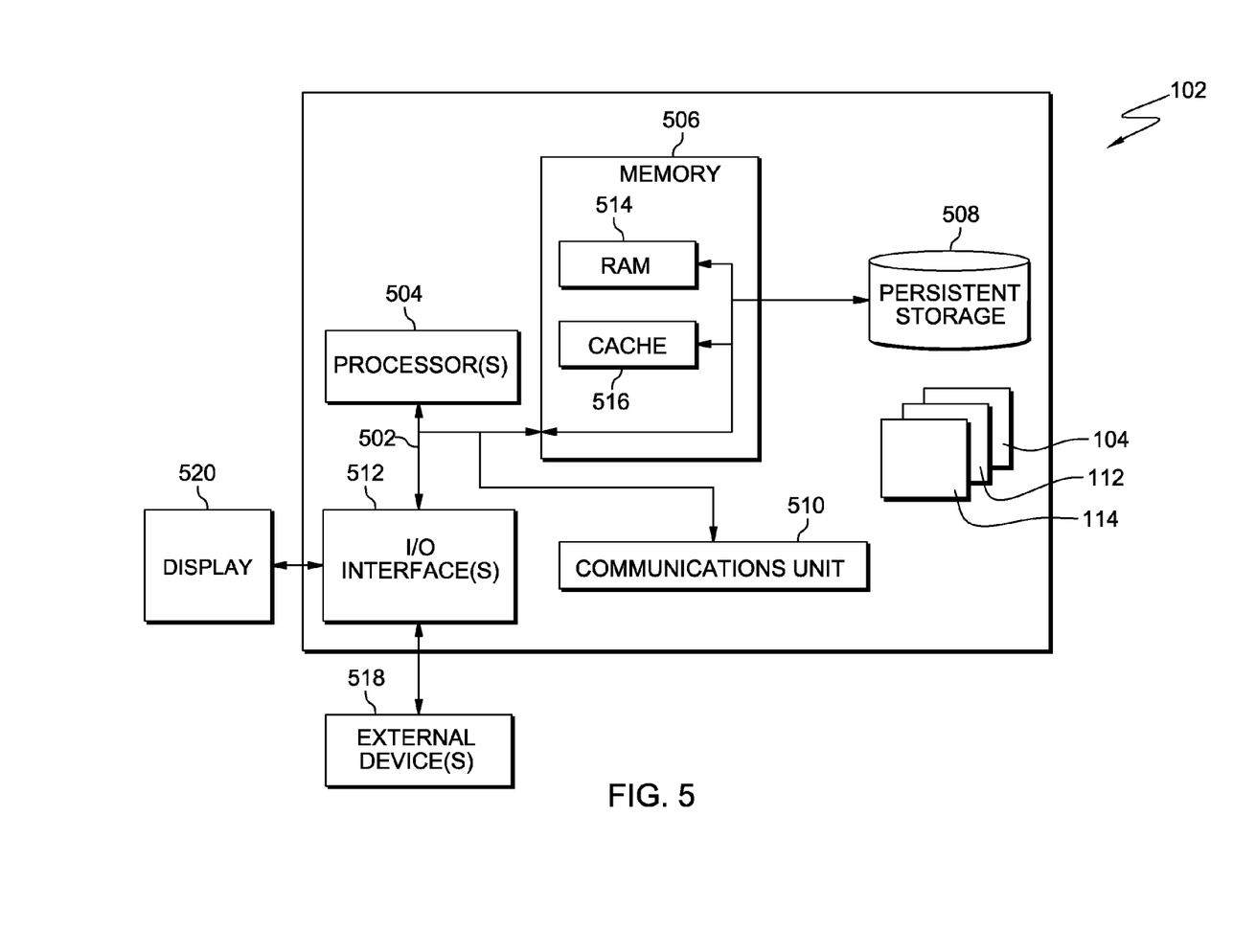
FIG. 5 depicts a block diagram of components of the computer device executing the debugger program, in accordance with an embodiment of the present invention.

FIG. 5 depicts a block diagram of components of computer device 102 in accordance with an illustrative embodiment of the present invention. It should be appreciated that FIG. 5 provides only an illustration of one implementation and does not imply any limitations with regard to the environments in which different embodiments may be implemented. Many modifications to the depicted environment may be made.

Computer device 102 includes communications fabric 502, which provides communications between computer processor(s) 504, memory 506, persistent storage 508, communications unit 510, and input/output (I/O) interface(s) 512. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses.

Memory 506 and persistent storage 508 are computer-readable storage media. In this embodiment, memory 506 includes random access memory (RAM) 514 and cache memory 516. In general, memory 506 can include any suitable volatile or non-volatile computer-readable storage media.

CPUT 104, debugger program 112, and GUI automation program 114 are stored in persistent storage 508 for execution by one or more of the respective computer processors 504 via one or more memories of memory 506. In this embodiment, persistent storage 508 includes a magnetic hard disk drive. Alternatively, or in addition to a magnetic hard disk drive, persistent storage 508 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer-readable storage medium that is also part of persistent storage 508.

In these examples, communications unit 510 includes one or more network interface cards. Communications unit 510 may provide communications through the use of either or both physical and wireless communications links. CPUT 104, debugger program 112 and GUI automation program 114 may be downloaded to persistent storage 508 through communications unit 510.

I/O interface(s) 512 allows for input and output of data with other devices that may be connected to computer device 102. For example, I/O interface 512 may provide a connection to external devices 518 such as a keyboard, keypad, a touch screen, and/or some other suitable input device. External devices 518 can also include portable computer-readable storage media such as, for example, thumb drives, portable optical or magnetic disks, and memory cards. Software and data used to practice embodiments of the present invention, e.g., CPUT 104, debugger program 112 and GUI automation program 114 can be stored on such portable computer-readable storage media and can be loaded onto persistent storage 508 via I/O interface(s) 512. I/O interface(s) 512 also connect to a display 520.

Display 520 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions

What is claimed is:

1. A computer program product for managing window focus while debugging a computer program performing automation on a graphical user interface, the computer program product comprising:
one or more computer-readable storage media and program instructions stored on the one or more computer-readable storage media, the program instructions comprising:
program instructions to display in a first graphical user interface, program code of the computer program, wherein the computer program is designed to manipulate a second graphical user interface of another computer program;
program instructions to receive a command to debug the computer program, wherein the command initializes conversion of the first graphical user interface;
program instructions to convert the first graphical user interface into a focus-less graphical user interface;
program instructions to debug the computer program, wherein the computer program operates concurrently with said debugging;
subsequent to completion of said debugging, program instructions to restore the first graphical user interface into focus; and
wherein at least one of the steps is carried out using a computing device.

2. The computer program product of claim 1, wherein the focus-less graphical user interface is a semi-transparent display not accessible for manipulation by the second graphical user interface computer program.

3. The computer program product of claim 1, program instructions stored on the one or more computer-readable storage media, further comprising the step of:
program instructions to execute a user input filter.

4. The computer program product of claim 3, program instructions stored on the one or more computer-readable storage media, further comprising the steps of:
program instructions to receive a user input;
program instructions to check the user input according to a directory; and
responsive to determining the user input is in the directory, program instructions to display the user input on the focus-less graphical user interface.

5. The computer program product of claim 3, wherein the user input filter is one of: a keyboard entry, a mouse movement, or any communication from an electronic device to the computer program.

6. A computer system for managing window focus while debugging a computer program performing automation on a graphical user interface, the computer system comprising:
one or more computer processors;
one or more computer-readable storage media;
program instructions stored on the one or more computer-readable storage media for execution by at least one of the one or more computer processors, the program instructions comprising:
program instructions to display in a first graphical user interface, program code of the computer program, wherein the computer program is designed to manipulate a second graphical user interface of another computer program;
program instructions to receive a command to debug the computer program, wherein the command initializes conversion of the first graphical user interface;
program instructions to convert the first graphical user interface into a focus-less graphical user interface;
program instructions to debug the computer program, wherein the computer program operates concurrently with said debugging;
subsequent to completion of said debugging, program instructions to restore the first graphical user interface into focus; and
wherein at least one of the steps is carried out using a computing device.

7. The computer system of claim 6, wherein the focus-less graphical user interface is a semi-transparent display not accessible for manipulation by the second graphical user interface computer program.

8. The computer system of claim 6, program instructions stored on the one or more computer-readable storage media for execution by at least one of the one or more computer processors, further comprising the step of:
executing a user input filter.

9. The computer system of claim 8, program instructions stored on the one or more computer-readable storage media for execution by at least one of the one or more computer processors, further comprising the steps of:
receiving a user input;
checking user input according to a directory; and
responsive to determining the user input is in the directory, displaying the user input on the focus-less graphical user interface.

10. The computer system of claim 8, wherein the user input filter is one of: a keyboard entry, a mouse movement, or any communication from an electronic device to the computer program.

\* \* \* \* \*